(No Model.) 2 Sheets—Sheet 1.

R. B. LUNSFORD.
VELOCIPEDE.

No. 305,698. Patented Sept. 23, 1884.

Witnesses,
Geo. H. Strong
J. H. Arouse

Inventor,
R. B. Lunsford
By Dewey & Co
attorneys

N. PETERS, Photo-Lithographer, Washington, D. C.

(No Model.) 2 Sheets—Sheet 2.

R. B. LUNSFORD.
VELOCIPEDE.

No. 305,698. Patented Sept. 23, 1884.

Witnesses,
Geo. H. Strong
J. H. Nourse

Inventor,
R. B. Lunsford
By
Dewey & Co.
Attorneys

N. PETERS, Photo-Lithographer, Washington, D. C.

UNITED STATES PATENT OFFICE.

ROBERT B. LUNSFORD, OF OAKLAND, CALIFORNIA.

VELOCIPEDE.

SPECIFICATION forming part of Letters Patent No. 305,698, dated September 23, 1884.

Application filed February 7, 1884. (No model.)

*To all whom it may concern:*

Be it known that I, ROBERT B. LUNSFORD, of the city of Oakland, county of Alameda, and State of California, have invented an Improvement in Velocipedes; and I hereby declare the following to be a full, clear, and exact description thereof.

My invention relates to a new and useful velocipede; and it consists in a wheeled frame carrying a seat or chair, and in peculiar foot-levers pivoted to the frame behind the rear axle, and extending over and down in front of said axle, being connected with and driving the axle and wheels by means of pitmen extending from said levers to cranks on the axle. The connection between the frame and front axle, the means for guiding, the seat, the treadles and the draw-bar, form details of construction of my invention, all of which I shall hereinafter fully explain.

The object of my invention is to provide a simple and easy-running velocipede for practical road use.

Figure 1:
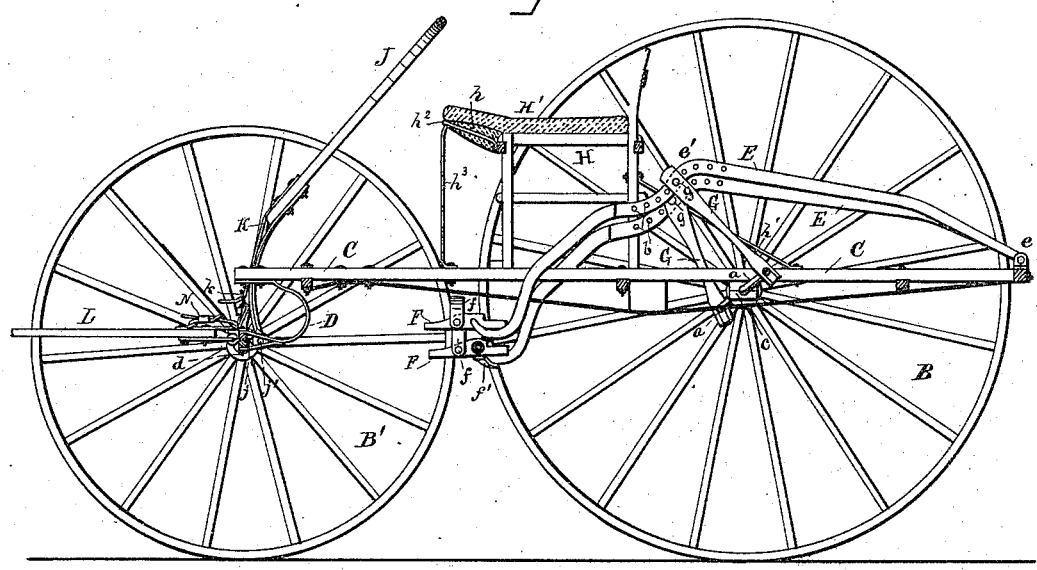
Figure 2:
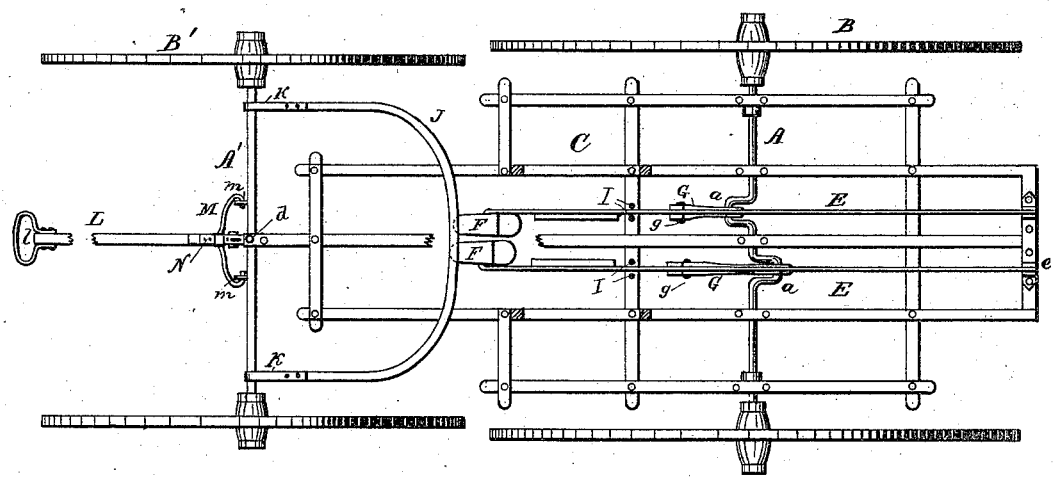
Figure 3:
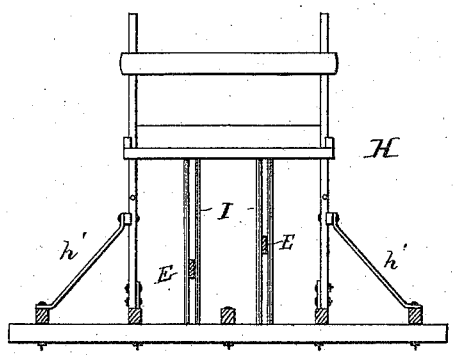
Figure 4:
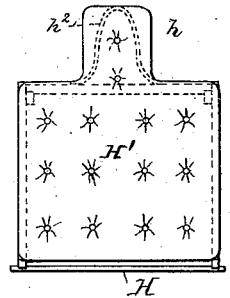

Referring to the accompanying drawings, Figure 1 is a vertical longitudinal section of my velocipede. Fig. 2 is a plan of the velocipede. Fig. 3 is a rear elevation of chair. Fig. 4 is a plan of seat.

A is the rear axle, having the wheels B fast on its ends. A' is the forward axle, the wheels B' of which are both loose on its ends.

C is the frame or body of the vehicle, composed of suitable longitudinal and cross strips. The frame is mounted on the rear axle by means of any suitable boxes or bearings, $c$, secured to it, in which said axle is journaled. The front end of the frame is supported on the forward axle by a spring, D, Fig. 1, which raises it to a horizontal. The king bolt or pin $d$ passes down through the spring and axle. The rear portion of the frame extends back beyond the rear axle, as shown, for the purpose of getting the fulcrum-points for the operating-levers E E, the rear ends of which are pivoted to the rear cross-bar of the frame by means of small bearings $e$ thereon. These levers bend upward, extending forward over the axle to a point designated in Fig. 1 by $e'$, where they curve downward somewhat rapidly, and thence bend down to a line about midway between the two axles, where they have the treadles F F pivoted to them. These treadles are provided with toe-straps $f f$, to confine the feet, whereby the upward stroke may be assisted. The rear axle is provided with alternating cranks $a$, with which are connected the pitmen G G, the upper ends of which are forked or slotted and embrace the levers E, being held by a pivot pin or bolt, $g$. The levers are provided with a series of holes, $b$, on each side of their turning-point, Fig. 1. In any of these the pitmen may be pivoted by the removal and insertion of the bolts $g$, by which means, on account of the shape of the levers at this point, the length of their movement or stroke may be varied at pleasure.

H is the seat, in the form of a chair, supported at a suitable altitude by and from the frame C. This chair is shown best in Figs. 1, 3. Its frame is braced by rods $h'$, and the forward part of the seat is carried out in a point or saddle, $h$, narrow enough for the legs to straddle, and well padded. The saddle is supported by an iron loop-frame, $h^2$, from which a brace, $h^3$, extends down to frame C. Over the chair and saddle is laid a correspondingly-shaped cushion, H'.

For ordinary use the rider is to sit more directly on the saddle, and thus have his work well under him; but when fatigued he can move back into the chair, where his back will find support, and he can still push along at ease.

From the frame C extend upwardly the rods I, Fig. 3, to the seat of the chair, acting as some of the braces therefor, but more particularly as guides for the levers E E, as shown. The length of the levers and their character and shape, having the weight between fulcrum and power, all make the operation very easy, and at the same time their position is advantageous, being above the frame, and not liable to meet with any obstruction. The rear under portions of the treadles are provided with small stops $f'$, which, by coming in contact with the ends of the levers, prevent a too great downward movement of the toe, and hold the treadles in position, their forward portion being heavier.

J is the steering-handle, in the shape of a bail, Fig. 2. The lower portion of this is preferably made of iron, being slotted, and fitting over the heads of eyebolts $j$, secured in the front axle. Pivot-pins $j'$ pass through the ends of the handle and eyes of the bolts, whereby the handle is secured to the axle, and adapted to turn it at an angle with the frame. While being pivoted it may be raised or lowered to convenient position. The axle turns on the king-pin $d$, by which the spring is secured; but in order to hold the handle up positively I have the leather straps K. The upper portions of these are bolted to the handle on the front, and the lower portions to the axle, the two being secured together by a buckle, $k$, Fig. 1. By tightening these straps the handle is raised and held at any position.

L is a bar or pole secured to the front axle and provided with a handle, $l$, by which means I can draw the machine when necessary. The connection between this pole and axle is made by means of a forked iron, M, Fig. 2, the ends or points of which fit eyebolts $m$ in the axle. A leather strap, N, holds the pole, when necessary, at any elevation.

The machine is simple in construction and easy to operate. The frame, being light and made of good springy wood, gives an easy motion and requires only a single spring in front.

Having thus described my invention, what I claim as new, and desire to secure by Letters Patent, is—

1. In a velocipede, the rear axle, A, having cranks $a$ and wheels B fast upon it, the frame C, having bearings $c$ in which said axle is journaled, and a wheeled support for the front of the frame, in combination with the foot-levers E E, pivoted to the frame behind the axle and extending over and down in front of it, said levers being provided with the series of holes $b$, as shown, and the pitmen G G, connecting the cranks $a$ with the levers and adapted to be adjusted on said levers by means of a pin fitting any of holes $b$, substantially as herein described.

2. In a velocipede, the wheeled frame C, and vertically-reciprocating foot-levers E E, by which it is driven, in combination with the chair H, having the vertical back brace-rods, I, between which the levers E E are guided, substantially as herein described.

3. In a velocipede, the rear axle, A, having cranks $a$ and wheels B fast upon it, the forward axle, A', having wheels B' loose thereon, in combination with the frame C, having bearings $c$ in which the rear axle is journaled, the spring D, secured to the forward axle by the king-bolt $d$ and supporting the forward end of the frame, the foot-levers E E, and pitmen G G, all arranged and operating substantially as herein described.

4. In a velocipede having a suitable frame, the front axle, A', to which said frame is pivoted and having wheels B' loose upon it, in combination with the bail or handle J, having slotted ends, the eyebolts $j$ in the axle, pivot-pins $j'$, and the straps K, secured to bail and axle for holding said bail up, substantially as herein described.

5. In a velocipede, the front axle, A', having eyebolts $m$, in combination with the pole or draw-bar L, having a handle, $l$, on its forward end, and a forked bar, M, on its rear end engaging with the eyebolts $m$, and the strap N, for holding up said pole, substantially as herein described.

6. In a velocipede, the rear axle, A, having cranks $a$ and wheels B fast upon it, the front axle, A', having wheels B' loose thereon, the frame C, having bearings $c$ in which the rear axle is journaled, the spring D, pivoted to the forward axle and supporting the front of the frame, and the seat H on the frame, in combination with the means for driving, consisting of the foot-levers E E and pitmen G G, and the means for guiding, consisting of the bail J, pivoted and secured to the forward axle, arranged substantially as herein described.

In witness whereof I have hereunto set my hand.

ROBERT B. LUNSFORD.

Witnesses:
C. D. COLE,
J. H. BLOOD.